United States Patent [19]

Fuse

[11] Patent Number: 4,995,622
[45] Date of Patent: Feb. 26, 1991

[54] MAGNETIC FLUID SEAL DEVICE

[75] Inventor: Toshihiko Fuse, Sanda, Japan

[73] Assignee: Nippon Pillar Packing Co., Ltd., Osaka, Japan

[21] Appl. No.: 306,853

[22] Filed: Feb. 7, 1989

[51] Int. Cl.⁵ ............................ F16J 15/00; F16J 9/00
[52] U.S. Cl. ...................................... 277/80; 277/135; 384/133
[58] Field of Search .................. 277/80, 135; 384/133, 384/477

[56] References Cited

U.S. PATENT DOCUMENTS

| | | | |
|---|---|---|---|
| 3,740,060 | 6/1973 | Miskolczy | 277/80 |
| 4,335,885 | 6/1982 | Heshmat | 277/80 X |
| 4,340,233 | 7/1982 | Yamamura et al. | 277/80 X |
| 4,380,356 | 4/1983 | Weghampt | 277/80 X |
| 4,407,508 | 10/1983 | Raj et al. | 277/80 X |
| 4,526,379 | 7/1985 | Raj | 277/80 |
| 4,527,802 | 7/1985 | Wilcock et al. | 277/80 X |
| 4,605,233 | 8/1986 | Sato | 277/135 X |
| 4,842,426 | 6/1989 | Furumura | 384/133 X |

FOREIGN PATENT DOCUMENTS

| | | | |
|---|---|---|---|
| 108161 | 8/1979 | Japan | 277/80 |
| 135269 | 10/1980 | Japan | 277/80 |
| 188622X | 9/1985 | Japan | 277/80 |
| 6271473 | 5/1987 | Japan | . |

Primary Examiner—William A. Cuchlinski, Jr.
Assistant Examiner—Scott Cummings
Attorney, Agent, or Firm—Jones, Tullar & Cooper

[57] ABSTRACT

A magnetic fluid seal device, with two or more pole pieces disposed around a magnetic rotating element on both sides of a permanent magnet, each pole piece being formed by alternately joining and first and second magnetic disks differing in inside diameter is related. Tiny gaps are formed between the inner circumference of the magnetic disks having the smaller inside diameter in each pole piece and the outer circumference of the magnetic rotating element, and a magnetic fluid is magnetically captured in these tiny gaps. The magnetic flux density in these gaps is set larger than the saturated magnetization of the magnetic fluid captured in these gaps and the thickness of the first magnetic disks is set somewhare between 0.02 and 0.0 mm.

4 Claims, 4 Drawing Sheets

MAGNETIC FLUID SEAL DEVICE

BACKGROUND OF THE INVENTION

1. Field of the Invention

This invention relates to a magnetic fluid seal device to be used as a non-contact shaft sealing part in vacuum equipment such as ion plating apparatus and dry etching apparatus, and rotating devices handling gas and other rotating shaft parts. A magnetic fluid seal device of this sort is free from friction noise, and attains a high degree of air tightness in a simple structure, and withstands high speed rotations of over thousands of rpm, and hence it is used widely in rotary shafts parts, replacing mechanical seals.

2. Description of the Prior Art

In the conventional magnetic fluid seal device of this sort, plural pole pieces in a cylindrical form with a thick wall were disposed in a housing around a magnetic shaft across a magnet to form narrow gaps between the pole pieces and the magnetic shaft, and magnetic fluid was magnetically captured in these gaps. In this basic structure, generally in order to obtain wide and narrow gaps (labyrinth) between the pole pieces and the magnetic shaft, for example, annular projections were formed around the magnetic shaft, or block rings having fine undulations on the inner surface were used as pole pieces as disclosed in the U.S. Pat. No. 3,488,531.

In such a magnetic fluid seal, however, it was very uneconomical to form undulations around the shaft or fine asperities on the inside of the block rings with high precision, and it was structurally impossible to form multiple magnetic fluid capturing parts having a high magnetic flux density in the narrow gaps in the axial direction.

As a magnetic fluid seal device for solving such problems, the present applicant previously proposed the device of using disk packs obtained by alternately joining and adhering magnetic disks differing in the inside diameter of the pole pieces as disclosed in the Japanese Utility Model Publication No. 62-71473.

However, in the magnetic fluid seal device disclosed in this Publication No. 62-71473, it was sometimes impossible to capture the magnetic fluid securely between the magnetic shaft and the magnetic disk of the smaller inside diameter side, and a sufficient sealing effect could not be obtained.

It has been found that the above problem was caused because of two reasons, that is:

(a) If the gap between the magnetic disk with the smaller inside diameter and the outer circumference of the magnetic rotating element is larger than the thickness of the magnetic disk of the smaller inside diameter, the magnetic flux density between the magnetic disk and the magnetic rotating element, serving as the sealing part, is lowered.

(b) When the magnetization of the magnetic fluid in the tiny gaps is not sufficient, the magnetic fluid cannot be captured securely between the magnetic disk of the smaller inside diameter and the magnetic shaft.

That is, due to causes (a) and (b), the differential pressure resistance characteristics between the primary side and secondary side of the magnetic fluid device are lowered, thereby making it impossible to maintain the desired high air tightness.

SUMMARY OF THE INVENTION

It is hence a primary object of this invention to provide a magnetic fluid device suited to practical use without lowering the differential pressure resistance characteristics in the light of solving the above-discussed problems.

It is another object of this invention to prevent the reduction of differential pressure resistance characteristics by maintaining the magnetic flux density between the magnetic disk and the magnetic rotating element which serve as the sealing part.

It is another object of this invention to prevent the reduction of differential pressure resistance characteristics by sufficiently magnetizing the magnetic fluid in tiny gaps.

In order to achieve the above objects, the magnetic fluid seal device of this invention is so designed that each pole piece possesses at least two first magnetic disks, and the tiny gap between the inner circumference of the first magnetic disks and the outer circumference of the confronting magnetic rotating element is set to be less than the thickness of the second magnetic disks having the larger inside diameter and not less than 0.02 mm.

In such a magnetic fluid seal device, since the gap between the magnetic rotating element and the magnetic disks having the smaller inside diameter is larger than the gap against the magnetic disks having the smaller inside diameter, the magnetic flux is concentrated between the magnetic rotating element and the magnetic disks having the smaller inside diameter. Therefore, the differential pressure resistance characteristics between the primary side and the secondary side of the magnetic fluid seal device may be set to a high level for effectively utilizing the magnetic force of the permanent magnet. Besides, since the gaps between the magnetic rotating element and the magnetic disks are maintained more than 0.02 mm, the realization is not restricted by the processing precision or assembling precision. The same effect is obtained by the fact that the thickness of magnetic disks is kept at 0.02 mm or more. That is, it is free from effects of processing error or assembling error.

Another characteristic of the magnetic fluid seal device of this invention is that the magnetic flux density in the gap between the magnetic rotating element and the magnetic disk by the magnet is set larger than the saturated magnetization of the magnetic fluid captured in the gap, and the thickness of the first magnetic disks is set somewhere between 0.02 and 1.0 mm.

In this construction since the magnetic flux density in the tiny gap between the magnetic rotating element and the first magnetic disk is greater than the saturated magnetization of the magnetic fluid captured in the gap, the magnetic fluid is captured by the upper limit magnetism in the tiny gap. Therefore, the differential pressure resistance characteristics between the primary side and secondary side of the magnetic fluid seal device can be advantageously set to the highest possible level in the magnetic fluid being used. In addition, since the thickness of the first magnetic disks is 0.02 to 1.0 mm, the manufacture is not restricted by processing precision or assembling precision, and, at the same time, the magnetic flux density is enhanced as for the first magnetic disks.

The magnetic fluid seal device of this invention is also characterized by the annular design of the magnetic disposed among the pole pieces.

In this structure, the assembling is extremely easy.

Still another feature of the magnetic fluid seal device of this invention is characterized by the annular arrangement of plural columnar magnets among pole pieces.

Such a structure is applicable also when the aperture of the device is large.

Other features and effects of the invention will be better understood and appreciated from the following detailed description taken in conjunction with the drawings.

DETAILED DESCRIPTION OF THE PREFERRED EMBODIMENTS

Figure 1:
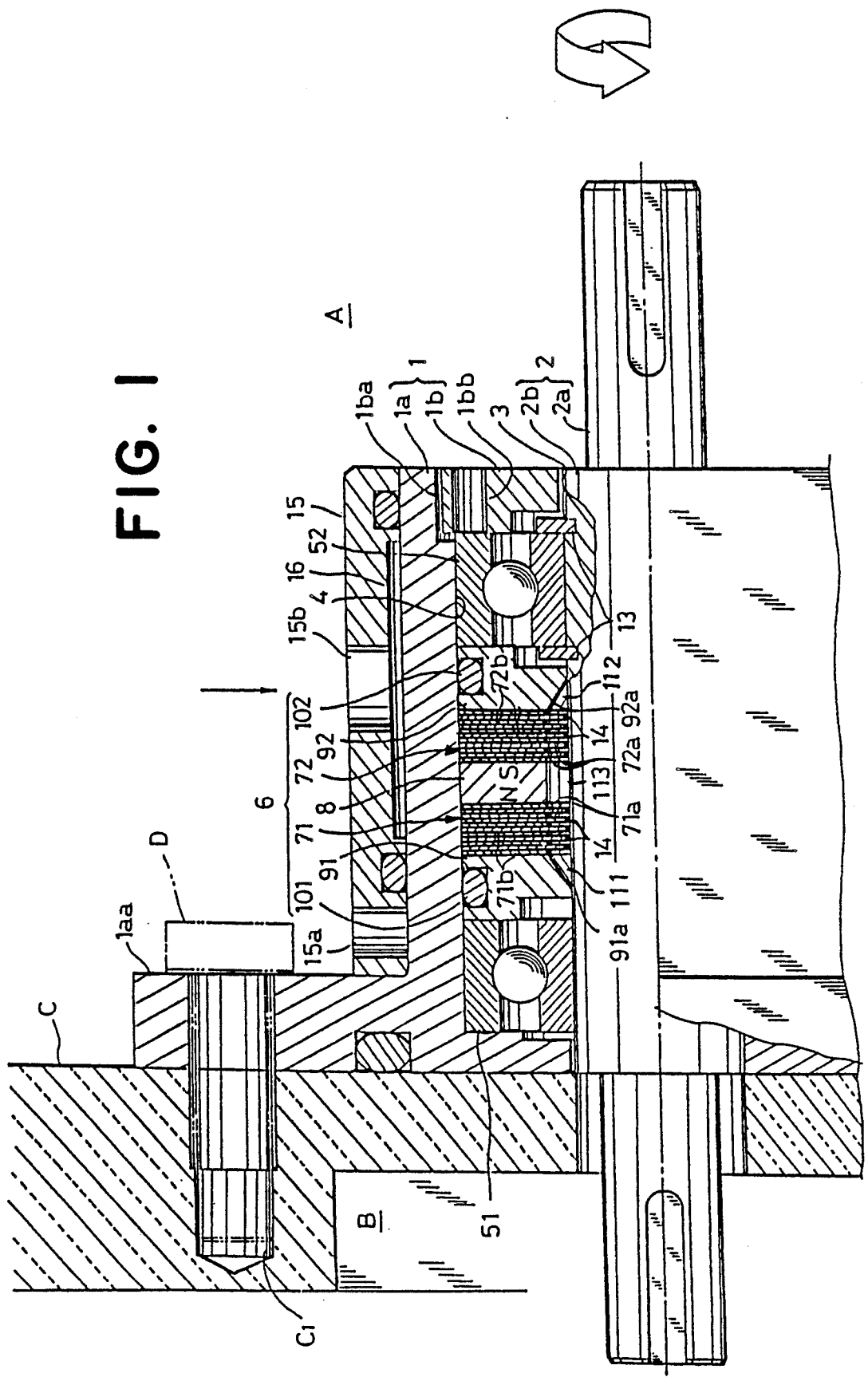
FIG. 1 is a longitudinal sectional view of a magnetic fluid seal device according to one embodiment of the invention.
Figure 2:
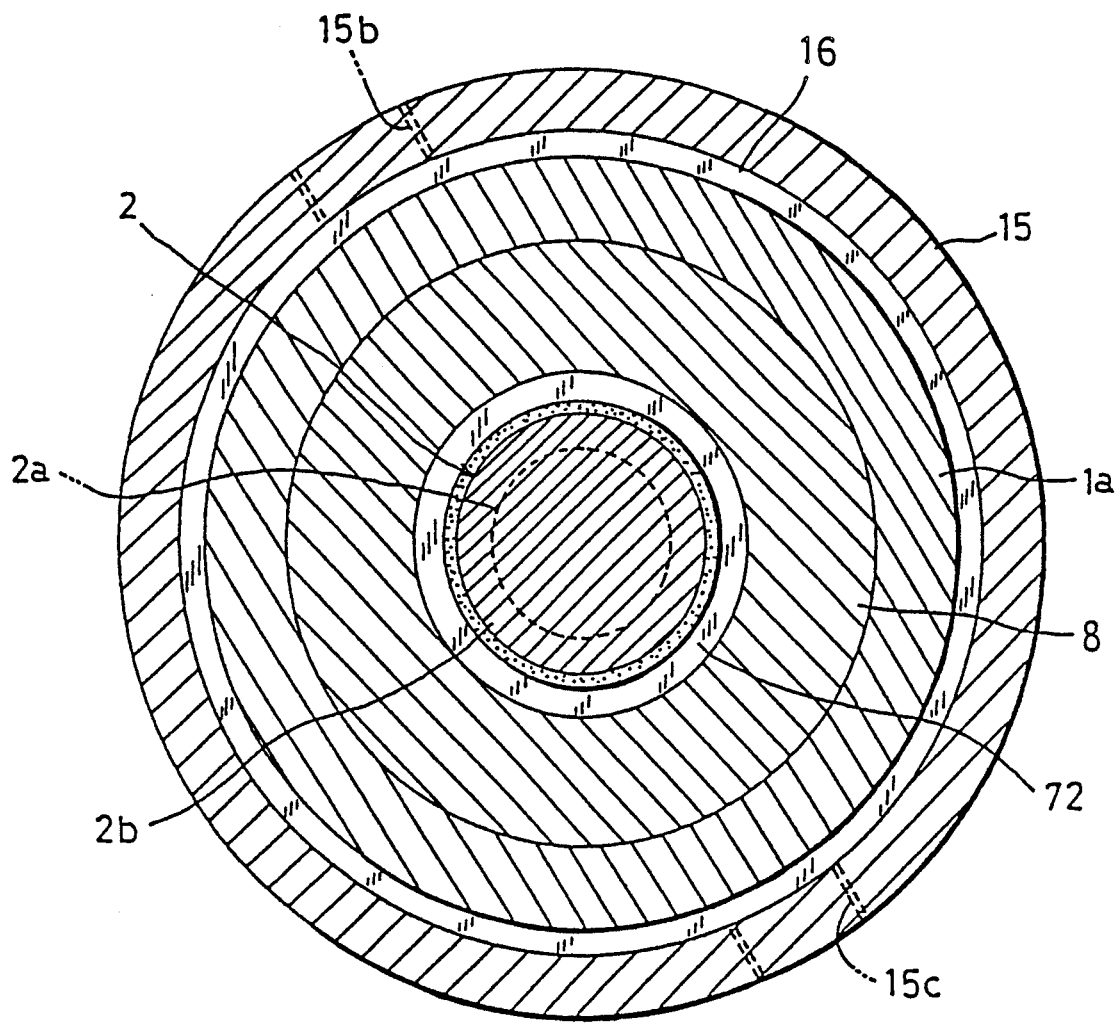
FIG. 2 is a transverse sectional view at right angles to the longitudinal axis in FIG. 1.
Figure 3:
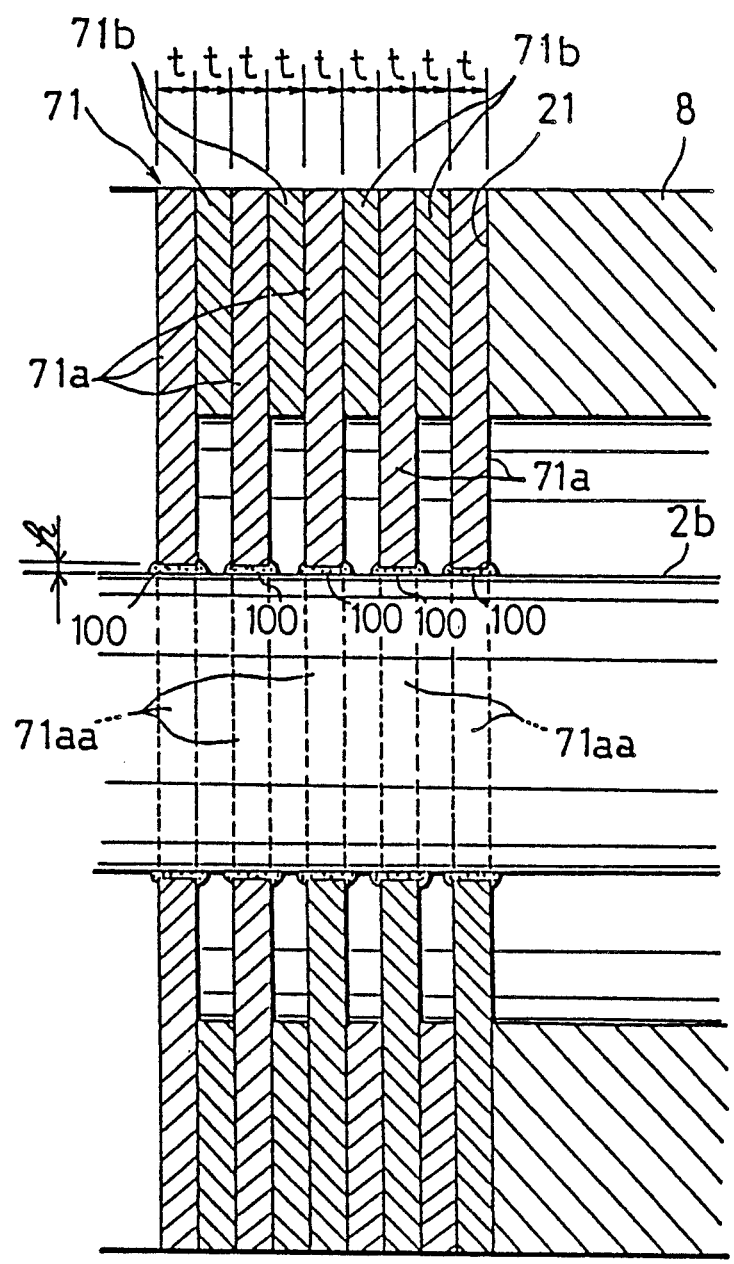
FIG. 3 is an enlarged view of certain essential parts of the magnetic fluid seal device of FIG. 1.

Referring now to FIGS. 1 to 3, numeral 1 denotes a nonmagnetic housing. This housing 1 is composed of a cylindrical housing main body 1a fixed to a partition wall C between the atmosphere side A and vacuum side B in the device casing, and a housing cover 1b for closing the opening disposed at the atmosphere side A of the housing main body 1a, and a shaft hole 3 provided in the central part for inserting a magnetic shaft 2 which penetrates through the atmosphere side A and the vacuum side B. That is, the nonmagnetic housing 1 is disposed around the magnetic shaft 2, and an annular accommodation compartment 4 is formed between it and the magnetic shaft 2. In the housing main body 1a, a flange 1aa is formed at the end part of the vacuum side B, and the housing main body 1a is affixed to the partition wall C by driving a hexagon bolt D penetrating through this flange 1aa into the screw hole C1 provided in the partition wall C. The magnetic shaft 2 is composed of a small diameter part 2a at the end part side and a large diameter part 2b in the middle, and the nonmagnetic housing 1 is disposed around this large diameter part 2b.

The compartment 4 accommodates bearings 51, 52 and a seal mechanism 6 which intervenes between the nonmagnetic housing 1 and magnetic shaft 2. That is, deep inside the compartment 4, one bearing 51 is placed, and the seal mechanism 6 is installed between this bearing 51 and the other bearing 52.

The seal mechanism 6 is composed of two sets of pole pieces 71, 72, a permanent magnet 8 held between these pole pieces 71, 72, spacers 91, 92 adhered to the outer walls of the pole pieces 71, 72, O-rings 101, 102 fitted in the grooves formed in these spacers 91, 92, and a magnetic fluid 14.

The pole pieces 71, 72 are respectively composed, as a disk pack, of first magnetic disks 71a and second magnetic disks 71b, or first magnetic disks 72a and second magnetic disks 72b joined and adhered by a specified number of pieces alternately. These first magnetic disks 71a, 72a, and second magnetic disks 71b, 72b are made of corrosion resistant materials, such as SUS 403, and are all formed in a uniform thickness t (FIG. 3). This thickness t is defined to be 0.02 mm or more, so as not to be restricted by the processing precision or assembling precision, and is also set to be 1.0 mm or less in order to enhance their own magnetic flux density, as for the first magnetic disks 71a, 72a, and to enhance the magnetic flux density of the first magnetic disks 71a, 72a as for the second magnetic disks 71b, 72b. Within this range of 0.02 to 1.0 mm, the thickness is determined at the value to satisfy the conditions mentioned below.

The first magnetic disks 71a (72a) possess an inside diameter slightly larger than the outside diameter of the large diameter side 2b of the magnetic shaft 2, and possess an outside diameter nearly equal to the inside diameter of the compartment 4. That is, when the pole pieces 71 (72) are put into the compartment 4, on the outer circumference of the first magnetic disks 71a (72a) and the large diameter part 2b, a magnetic fluid capturing part 100 is formed oppositely across a tiny gap h as shown in FIG. 3. On the other hand, the second magnetic disks 71b (72b) possess an inside diameter larger than that of the first magnetic disks 71a (72a), and the outside diameter equal to that of the first magnetic disks 71a (72a). The first magnetic disks 71a (72a) and the second magnetic disks 71b (72b) are joined and adhered alternately by means of resin or silver solder.

The gap h between the first magnetic disks 71a (72a) forming the magnetic fluid capturing part 100 and the outer circumference of the large diameter part 2b is set to be smaller than the gap between the adjoining first magnetic disks 71a, 71a (or 72a, 72a), that is, less than the thickness t of the second magnetic disks 71b (72b). This gap h is, at the same time, set to be 0.02 mm or more because it is restricted by the processing precision and assembling precision if less than 0.02 mm.

The permanent magnet 8 is formed in a ring shape possessing an inside diameter and outside diameter the same as those of the second magnetic disks 71b, 72b, and therefore a space 113 is formed between the inner circumference of the permanent magnet 8 and the outer circumference of the large diameter part 2b, and between the pole pieces 71, 72. Besides, the permanent magnet 8 is magnetized in the axial direction as shown in FIG. 1.

On the outside of the pole pieces 71, 72, spacers 91, 92 are adhered respectively by using epoxy resin or other resin adhesive. These spacers 91, 92 possess the same outside diameter as the pole pieces 71, 72 or permanent magnet 8, and on their inside there are taper faces 91a, 92a narrowing toward the side of the pole pieces 71, 72. The smallest inside diameter parts of the spacers 91, 92 on which the taper faces 91a, 92a are formed are slightly larger than the large diameter part 2b of the magnetic shaft 2, and therefore these smallest inside diameter parts are at a close gap to the outer circumference of the large diameter part 2b. On the other hand, the largest inside diameter parts of the taper faces 91a, 92 are nearly equal to the inside diameter of the second magnetic disks 71b, 72b. That is, the taper faces 91a, 92a form voids 111, 112 between the outer circumference of the large diameter part 2b of the magnetic shaft 2 and the pole pieces 71, 72.

O-rings 101, 102 are fitted in the grooves opened in the outer circumference of the spacers 91, 92, respectively, so as to maintain a sealing property against the inner wall of the compartment 4.

Numeral 13 is a snap housing for positioning the bearing 52 disposed at the open end side of the compartment 4.

Male threads 1ba are cut in the outer circumference of the housing cover 1b of the nonmagnetic housing 1, and by screwing the male threads 1ba into female threads cut in the inside of the housing main body 1a, the housing cover 1b presses the bearing 52 across the seal mechanism 6 to position the nonmagnetic housing 1 and magnetic shaft 1 in the axial direction, and also closes the open end at the atmosphere side A of the compartment 4. Numeral 1bb is a screw hole for driving in a set screw (not shown), and the set screw to be placed in this hole functions as a handle for screwing in the housing cover 1b and as a locking piece after being screwing in.

The magnetic fluid 14 is captured by the magnetic force of the permanent magnet 8 in the capturing part 100 formed between the inside of the first magnetic disks 71a, 72a, and the outside of the large diameter part 2b of the magnetic shaft 2 and its surroundings. That is, since a magnetic circuit is formed by the permanent magnet 8, pole pieces 71, 72 and the magnetic shaft 2, the magnetic flux is concentrated in the capturing part 100 which has a tiny gap h, and the incoming magnetic fluid 14 is captured.

Numeral 15 denotes a cylindrical jacket detachably mounted on the outside of the nonmagnetic housing 1. This jacket 15 is to form a cooling chamber 16 against the outer circumference of the housing main body 1a, and is mounted on the housing main body 1a by a set screw (not shown) driven in the screw hole 15a. Numeral 15b is a change passage opened in the peripheral wall of the jacket 15, and the cooling fluid is pressure-fed into the cooling chamber 16 through this charge passage 15b from a cooler (not shown). In FIG. 2, 15c denotes a discharge passage opened in the peripheral wall of the jacket 15 in order to discharge the cooling fluid from the cooling chamber 16, and the cooling fluid entering the cooling chamber 16 from the charge passage 15b is discharged from the discharge passage 15c, so that the cooling fluid circulates between the cooler and the cooling chamber 16.

The magnetic flux density M' in the tiny gap h may be regarded as follows, for example, at the pole piece 71 side, that is, supposing the magnetic flux density of the permanent magnet 8 to be B, its sectional area to be A, the area of the inner face 71aa of the first magnetic disks, 71a in the pole piece 71 to be s, the number of the first magnetic disks 71a to be n, the following relation is established:

$$M' = \frac{B \cdot A}{s \cdot n} \quad \text{(a)}$$

This magnetic flux density M' is greater than the saturated magnetization M of the magnetic fluid 14, that is, $$M' = \frac{B \cdot A}{s \cdot n} > M \quad \text{(b)}$$

$$s \cdot n < \frac{A \cdot B}{M} \quad \text{(c)}$$

Accordingly, since the internal circumferential area s of the first magnetic disk 71a is $$s = \pi \cdot Ds \cdot t \quad \text{(d)}$$

where Ds is the inside diameter of the first magnetic disk 71a and t is the thickness, and the above equation (c) may be rewritten as $$\pi \cdot Ds \cdot t \cdot n < \frac{B \cdot A}{M} \quad \text{(e)}$$

$$t \cdot n < \frac{B \cdot A}{\pi \cdot Ds \cdot M}$$

That is, in order to set the magnetic flux density M' larger than the saturated magnetization M, the thickness t and number n of the first magnetic disks 71a should be determined so as to satisfy the equation (e). Meanwhile, in the foregoing embodiment, supposing the outside diameter of the permanent magnet 8 to be Do and its inside diameter to be $D_I$, since the entire annular portion defined by them contacts with the pole pieces 71, the contact area A of the permanent magnet 8 and the pole pieces 71 is expressed as $$A = \frac{\pi}{4}(Do^2 - D_I^2)$$

Moreover, the thickness t of the first magnetic disk 71a is determined in a range of 0.02 to 1.0 mm as mentioned above, as well as to satisfy the equation (e). The number n of the first magnetic disks 71a in the pole pieces 71 should be preferably set between 2 and 10. If the number of first magnetic disks 71a exceeds 10, the effect of the magnetic field on the remotest piece of the first magnetic disks 71a from the permanent magnet 8 becomes small, and it is meaningless to increase more.

The pole pieces 72 are composed exactly in the same way and are not particularly explained herein.

Thus, the magnetic fluid seal device produces a tight seal between the atmosphere side A and the vacuum side B by the magnetic fluid magnetically captured in the magnetic fluid capturing part 100 between the first magnetic disks 71a, 72a and the large diameter part 2b of the magnetic shaft 2. This magnetic fluid capturing part 100 is formed in the voids 111 to 113, and therefore the magnetic fluid 14 is pooled in these voids 111 to 113, and will not drift away from the magnetic fluid capturing part 100. Accordingly, reduction of the sealing effect due to decrease of magnetic fluid is prevented. Besides, if the viscosity heat generation increases due to an increase in the rotating speed of the magnetic shaft 2, the pole pieces 71, 72 can be cooled by circulating the cooling water into the cooling chamber 16 by attaching the jacket 15. This magnetic fluid seal device may be assembled only by sequentially incorporating the bearing 51, the assembled body of spacer 91 and pole piece 71, permanent magnet 8, the assembled body of pole piece 72 and spacer 92, and bearing 52, and then mounting the housing cover 1b on the housing main body 1a.

Figure 4:
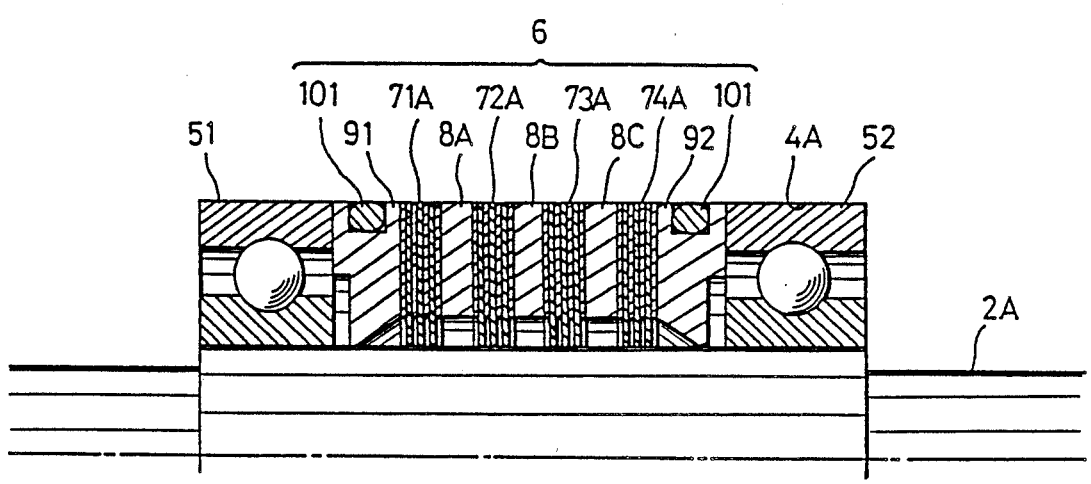
FIG. 4 is a longitudinal sectional view of a magnetic fluid seal device according to another embodiment of the invention.

The embodiment in FIGS. 1 to 3 is designed to comprise a magnetic circuit with one permanent magnet and two pole pieces, but, as shown in FIG. 4, the magnetic circuit may also comprise three permanent magnets 8A, 8B, 8C and four pole pieces 71A, 72A, 73A, 74A, in which the pressure resistance may be further enhanced. In this case, the magnetic fluid seal composed of one permanent magnet and two pole pieces is set up in three stages. If the number of stages of this magnetic fluid seal exceeds 10, the axial length is excessive, and deflection may be caused, making it difficult to set the tiny gap accurately. Hence it is desired to set the number of stages to be within 10 stages. It is also known that the starting torque of the magnetic rotating element becomes excessively large if the magnetic fluid seal exceeds 10 stages. In FIG. 4, however, the other parts than the inside of the compartment 4 and the magnetic shaft 2A are omitted, and the same parts as in FIG. 1 are identified with the same reference numbers.

Figure 5:
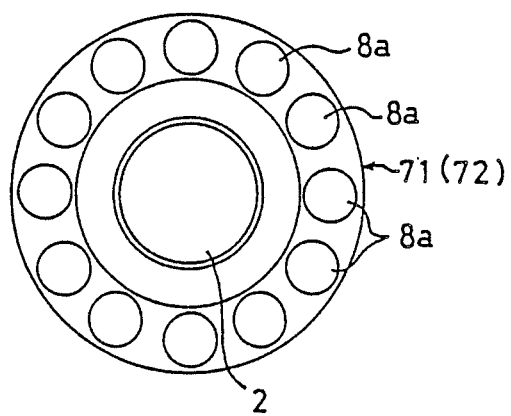
FIG. 5 illustrates a modified example of a magnet.

Besides, in this invention, if the aperture of the device is wide, instead of the annular permanent magnet 8 in the foregoing embodiments, plural columnar permanent magnets 8a may be arranged in an annular configuration as shown in FIG. 5.

What is claimed is:

1. A magnetic fluid seal device mounted about the circumference of a magnetic rotating element, comprising:
    a plurality of sets of pole pieces, each set having at least a first and second magnetic disk of different inside diameters alternately joined together; and
    a magnet disposed between adjacent sets of pole pieces, wherein:
    the first magnetic disks in each set have an inside diameter smaller than the inside diameter of the second magnetic disks in their respective set;
    a gap is formed between the magnetic rotating element and each of the first magnetic disks in each set, in which magnetic fluid is captured, said gap being set to be less than the thickness of the second magnetic disks;
    the magnetic flux density in each gap is set larger than the saturation magnetization of the magnetic fluid captured in each gap; and
    the thickness of the first magnetic disks in each set is established between 0.02 and 1.0 mm.

2. A magnetic fluid seal device according to claim 1, wherein:
    the thickness of the second magnetic disks in each set is established between 0.02 and 1.0 mm.

3. A magnetic fluid seal device according to claim 1, wherein:
    the magnet disposed between adjacent sets of pole pieces is annular.

4. A magnetic fluid seal device according to claim 2, wherein:
    the magnet disposed between adjacent sets of pole pieces is annular.

* * * * *

UNITED STATES PATENT AND TRADEMARK OFFICE
CERTIFICATE OF CORRECTION

PATENT NO. : 4,995,622

DATED : February 26, 1991

INVENTOR(S) : Toshihiko FUSE

It is certified that error appears in the above-identified patent and that said Letters Patent is hereby corrected as shown below:

Claim 1, column 7, line 23, "different" should be "differing".

Signed and Sealed this

Twenty-eighth Day of July, 1992

Attest:

DOUGLAS B. COMER

*Attesting Officer*  *Acting Commissioner of Patents and Trademarks*